(12) United States Patent
McKenzie

(10) Patent No.: US 7,117,061 B1
(45) Date of Patent: Oct. 3, 2006

(54) PRODUCT ASSEMBLY METHOD AND APPARATUS USING WIRELESS COMMUNICATION CAPABILITY

(76) Inventor: John D. McKenzie, 3163 E. Village La., Port Huron, MI (US) 48060

( * ) Notice: Subject to any disclaimer, the term of this patent is extended or adjusted under 35 U.S.C. 154(b) by 0 days.

(21) Appl. No.: 11/030,238

(22) Filed: Jan. 6, 2005

Related U.S. Application Data (62) Division of application No. 10/353,649, filed on Jan. 29, 2003, now Pat. No. 6,856,844.

(51) Int. Cl.
G06F 19/00 (2006.01)
G06F 15/16 (2006.01)

(52) U.S. Cl. .................. 700/116; 700/96; 709/200

(58) Field of Classification Search ............... 700/9, 700/19, 66, 95, 96, 99, 113–116; 709/200
See application file for complete search history.

(56) References Cited

U.S. PATENT DOCUMENTS

| | | | |
|---|---|---|---|
| 4,831,539 A | 5/1989 | Hagenbuch | |
| 4,887,064 A | 12/1989 | Drori et al. | |
| 5,361,305 A | 11/1994 | Easley et al. | |
| 5,479,479 A | 12/1995 | Braitberg et al. | |
| 5,530,918 A | 6/1996 | Jasinski | |
| 5,642,103 A | 6/1997 | Tokuda et al. | |
| 5,935,180 A | 8/1999 | Fieramosca et al. | |
| 6,028,537 A | 2/2000 | Suman et al. | |
| 6,109,568 A | 8/2000 | Gilbert et al. | |
| 6,516,239 B1 * | 2/2003 | Madden et al. | ............ 700/115 |
| 6,567,714 B1 * | 5/2003 | O'Connor et al. | ............ 700/95 |
| 6,687,587 B1 | 2/2004 | Kacel | |
| 6,694,206 B1 | 2/2004 | O'Connor et al. | |
| 2002/0070851 A1 | 6/2002 | Raichle et al. | |
| 2002/0164976 A1 | 11/2002 | Chen et al. | |

OTHER PUBLICATIONS

The Microsoft Computer Dictionary 1999, 4th edition, Microsoft Press, p. 17.

* cited by examiner

*Primary Examiner*—Albert W. Paladini
*Assistant Examiner*—Sean Shectman
(74) *Attorney, Agent, or Firm*—Young & Basile, P.C.

(57) ABSTRACT

An assembly line data communication system using wireless transmissions between access point transceivers along a plant data network and a mobile transceiver temporarily physically associated with each product proceeding down an assembly line served by the network. The unique identity of the product is communicated to the assembly line network controller at the entry end of each series of work cells and correct product order in a queue is maintained so that the specific identity and specification of the product is known at each of several subsequent and serially arranged work cells through which the product passes. Each work cell can talk to one or more access point transceivers in the network to communicate data to the mobile transceiver on the vehicle and to receive information back from it.

6 Claims, 9 Drawing Sheets

| Step Number | WORKCELL - A WC - A | MOBILE TRANSCEIVER A MT - A | WORKCELL - B WC - B |
|---|---|---|---|
| 10 | | | Sends "Session Request" message to MT - A |
| 11 | | The communication link to WC - A is still active. The "Session Request" message from WC - B is ignored or rejected | |
| 12 | | | Receives rejection notification from MT - A or determines that the "Session Request" message has timed out |
| 13 | | | Waits a configurable amount of time before re-attempting the connection to MT - A |
| 14 | | | Repeats steps 10 through 13 until "Session Request" acknowledged |
| 15 | Reaches end of assembly process | | |
| 16 | Sends "Session End" message to MT - A and terminates active message exchange with MT - A | | |
| 17 | | Receives " Session End" message and terminates active message exchange with WC - A | |
| 18 | | Waiting for "Session Request" message from any WC | |

FIG - 5B

| Step Number | WORKCELL - A WC - A | MOBILE TRANSCEIVER A MT - A | WORKCELL - B WC - B |
|---|---|---|---|
| 19 | Repeats beginning with step 2 for next vehicle and next mobile transceiver | | Sends "Session Request" message to MT - A |
| 20 | | Recieves "Session Request" message from WC - B | |
| 21 | | Sends "Session Accepted" message to WC - B and ignores or rejects all other "Session Request" messages | |
| 22 | | Begins active message exchange with WC - B | Receives MT - A "Session Accepted" message and begins an active message exchange with MT - A |

PRODUCT ASSEMBLY METHOD AND APPARATUS USING WIRELESS COMMUNICATION CAPABILITY

CROSS-REFERENCE TO RELATED INVENTION

This application is a divisional of U.S. Ser. No. 10/353,649, filed Jan. 29, 2003, now U.S. Pat. No. 6,856,844 issued Feb. 15, 2005 and claims priority thereto.

FIELD OF THE INVENTION

This patent specification describes a product assembly method and apparatus using wireless communication technology between the onboard intelligence of the product being assembled and an assembly plant data network.

BACKGROUND OF THE INVENTION

Automotive vehicles and other products with onboard intelligent systems are progressively assembled in a series of work cells where different assembly, installation and test operations are performed. In the case of a vehicle, the intelligent onboard systems may, for example, include controllers for engine controls, anti-lock brakes, lighting systems, navigation systems and active cruise controls, all of which are interconnected by way of a master wiring harness. According to current American automotive standards, the wiring harness includes a data entry port in the form of a multi-pin plug connector under the dashboard for use in both factory assembly and post-delivery service and diagnostic procedures. Many of the assembly operations include data communication between the vehicle and a work cell. In the typical assembly plant, this is accomplished by having a worker at the cell location make a plug connection to the multi-pin connector after the vehicle arrives in the work cell and un-make the connection after the operations carried on in that work cell are completed but before the vehicle moves to the next cell.

There are various problems and inefficiencies associated with this approach. For one, the multi-pin connector under the dashboard of a vehicle is typically not intended for a high number of plugging and unplugging operations. As a result, the plugging and unplugging operations which are carried on during the assembly process may account for a substantial portion of the life expectancy of the plug connector and/or damage the connector to the point that replacement is required.

More importantly, the process is inefficient in that usable time is lost as the vehicle progresses between work cells. By way of example, the operation at a given work cell may require certain vehicle preparation steps, such as opening a window, accelerating an engine to a predetermined RPM or turning on headlamps. It would be more efficient to perform these preparation steps before the vehicle arrives at the work cell in which the assembly operations associated with the preparation steps are carried out; i.e., while the vehicle is between work cells.

A related inefficiency arises from the fact that the vehicle is essentially out of contact with the work cells and any assembly plant network which may be connected to the work cells for data communication purposes during the time the vehicle is unplugged. There are numerous operations such as downloading software into the vehicle intelligence which can be performed during the movement between work cells, but the current physical apparatus does not allow these operations to be performed until the vehicle arrives at the next cell and is replugged into the network.

While the foregoing mentions vehicle assembly operations, the statements made are also true for other intelligence-carrying products assembled in a progressive, multiple-work cell manner.

GLOSSARY OF TERMS

Throughout the following specification, the following terms are used, unless otherwise indicated, with the following associated meanings:

Work cell: An area on the assembly line where one or more manual or automated assembly operations occur.

Work Cell Controller: A computing device (PC, PLC, Robot Controller) that controls the sequence of automated actions within a work cell.

Plant Network: The data distribution system whereby work cell controllers and other plant floor computing devices receive information about the content and makeup of the product being assembled, and transmit status and testing results to a central data store. Typically, the Plant Network consists of several Ethernet hubs and connection points connected by a broadband cable.

Remote Wireless Device: Any fixed or portable device which uses a wireless transceiver as a means of connecting to a data network.

Wireless Access Point: A device which provides a bridge between a wireless network and a cabled network. The access point is equipped with both a connection to the plant network and a wireless transceiver capable of maintaining simultaneous data connections to one or more remote wireless devices. Through the wireless access point, wireless devices appear as though they were hardwired to the plant network.

Effective Area of Coverage: The area of the plant floor around an access point in which sufficient signal strength exists to maintain an active communication link between a remote wireless device and the access point. Typically, the effective area of an access point is described by a 10 to 100 meter radius circle around the access point antenna.

Overlapping Coverage: Multiple wireless access points may be arranged such that the effective area of one access point overlaps the effective area of one or more neighboring access points. The overlap ensures that a remote wireless device is always within range of at least one wireless access point. A discriminator within the remote wireless device is used to maintain a data connection to the access point with the greatest signal strength.

Roaming: Occurs when a remote wireless device successfully switches an active data connection from one wireless access point to another. Roaming is typically handled automatically by the hardware and software of the wireless transceivers within the remote wireless device and the access point.

SUMMARY OF THE INVENTION

A first aspect of the present invention is the provision of an apparatus or system for establishing and maintaining data communication between a product being assembled in individual, sequentially-arranged work cells and an assembly plant network in which information about individual product content can be accessed. The product is of the type having (1) a unique, electronically-storable identifier such as a VIN, (2) onboard intelligence, and (3) a wiring system which includes a port through which the onboard intelligence can be accessed. The apparatus further comprises a plurality of physically dispersed wireless transceivers defining wireless access points connected in data transfer relationship with the network and with controllers at the work cells. Finally, the apparatus comprises a plurality of mobile wireless devices, each of which has a unique address for wireless data communication purposes, and is capable of being connected to and disconnected from the vehicle port.

The apparatus and method of the present invention, as hereinafter described, are such as to improve the efficiency of current assembly line operations as described above by reducing the number of plugging and unplugging operations which are made between work cell controllers and the onboard product electrical system, and utilizing the time and space between work cells to accomplish useful functions such as preparing the product for assembly operations to take place at upcoming work cells.

If desired, the system can be configured in such a way as to maintain wireless data communication contact between the product and the assembly plant network during the entirety of the assembly operation; i.e., essentially without gaps in the data communication contact as the product moves from cell to cell.

In the illustrative form hereinafter described, the inventive system includes an entry point in which a mobile transceiver selected from a queue is correlated with a particular product. Typically this correlation involves two steps which can be performed in any order: first, the address of the selected mobile transceiver is matched with the product identifier by scanning or otherwise inputting both codes to the network and, second, the mobile transceiver is installed in the product by plugging it into the onboard port.

In the following illustrative description, the mobile transceiver has an electronic address compatible with a communications protocol such as BLUETOOTH. This address can be inputted to the network by optically scanning an external bar code label or by keyboard or any other available technology. Where the product is a vehicle, the individual identifier code is the VIN and it can also be inputted by any available technology. Once paired, the mobile transceiver code and VIN stay together until this transceiver is removed from the vehicle, returned to the queue, installed in another vehicle, and paired in the network with another vehicle.

In the preferred form, the fixed-base wireless transceivers are located along an assembly line such that the mobile transceiver can be and often is in the RF range of two nearby access point transceivers at the same time. A given mobile transceiver will receive "session requests" and data only from the access point transceiver broadcasting a data pocket which includes the mobile transceiver's specific address. In addition, the mobile transceiver is preferably equipped to discriminate preferentially between access point transceivers on the basis of signal strength.

One access point transceiver may serve two or more work cell controllers, each of which can request a "session" substantially simultaneously. Each mobile transceiver is, therefore, equipped with intelligence to select the highest priority session request and reject all lower priority session requests until the session request in progress is finished. Priorities are assigned according to the order in which the work cells are encountered by a product on the assembly line.

If the access point transceivers have overlapping range, the product and the mobile transceiver can pass seamlessly from one access point transceiver to another without loss of data communication time or gaps which would otherwise slow down or extend the assembly operation.

In accordance with the present invention, the mobile transceiver may remain with the vehicle after the primary assembly operation has taken place. For example, it may be desirable to leave the wireless transceiver in the vehicle and coupled to the vehicle intelligence while the vehicle is moved to and resides in a holding lot where post-assembly finishing operations are carried out. The mobile transceiver is useful in this regard for providing data regarding the vehicle and locating the vehicle in a remote fashion.

In accordance with another aspect of the invention, a process for establishing and maintaining individualized data communication between a product, individual work cell controllers and an in-plant network is provided. The product is of the type having a unique, electronically storable identifier, such as a VIN, onboard intelligence, and a wiring system including a port by which an outside device can access the onboard intelligence. In general, the process comprises the steps of electronically correlating the product identifier to an individual mobile transceiver and coupling the mobile transceiver to the onboard intelligence through the wiring system connector and logically coupling the address of the mobile transceiver to the product identifier. Thereafter, providing the identity of the product to each work cell allows the individual transceiver address to be used so that only data appropriate for the individual product is employed.

After physically and logically associating the mobile transceiver with the product, the product is then advanced along an assembly line or the like until it comes into range of the first access point transceiver. At that time, a data communication link is established and assembly operations involving the two-way communication of digital electronic data are performed. If the access point transceiver serves two or more work cell controllers, each of which is capable of issuing a session request, the mobile transceiver accepts the highest priority request and rejects the lower priority requests until the higher priority session is finished. Priority is established on the basis of the physical arrangement of the work cells and the order in which the product encounters them.

Various features and advantages of the invention will be best understood from a reading of the following specification which is to be taken with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION OF THE ILLUSTRATIVE EMBODIMENT

In the following description, the products being assembled are automotive vehicles such as passenger cars. It is to be understood that this is for purposes of illustration only and that the products may be of any character as long as they carry onboard intelligence compatible with wireless data communication.

Figure 1:
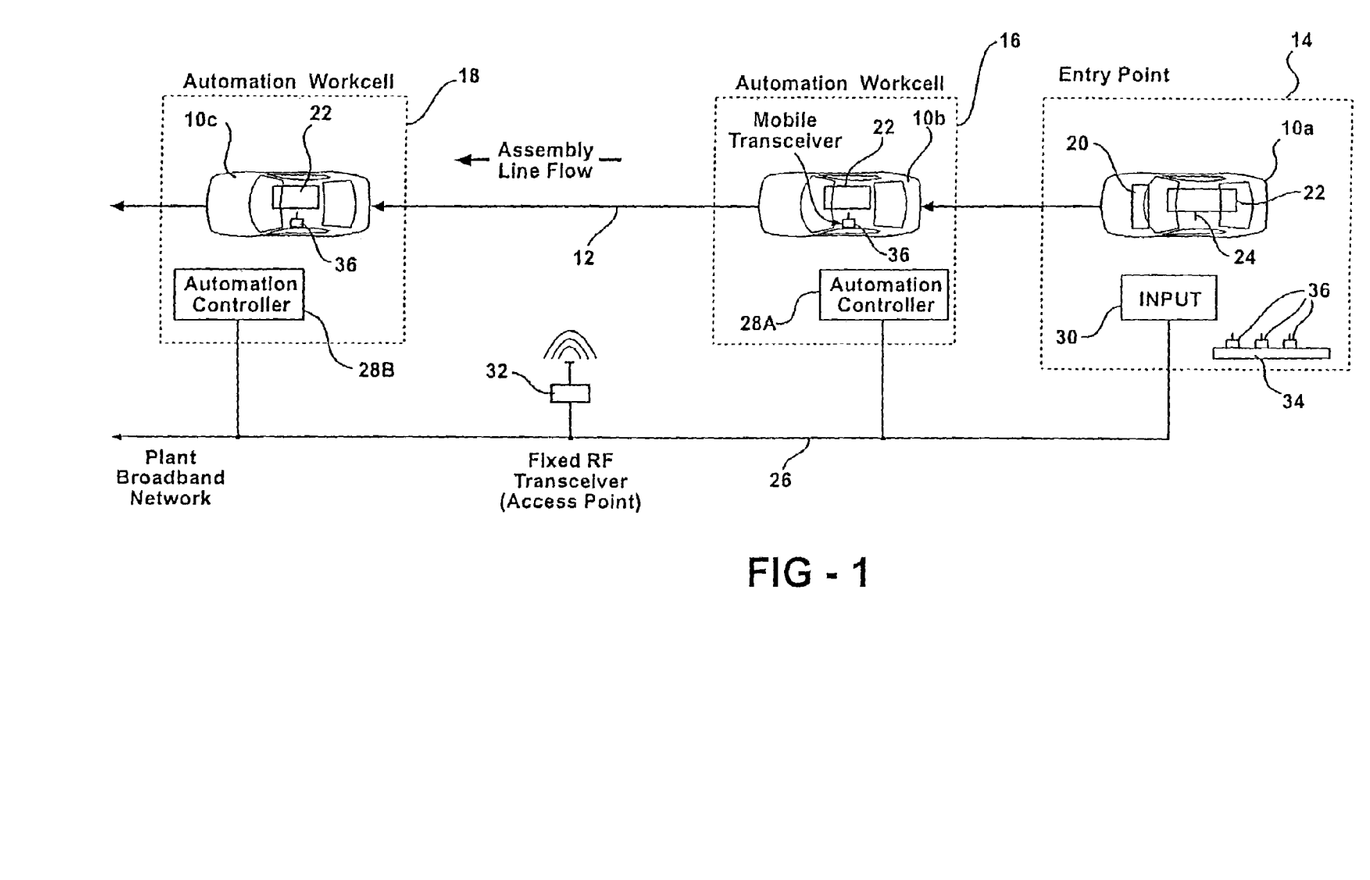
FIG. 1 is a plan view of a portion of a vehicle assembly line equipped for wireless communications according to the present invention.

FIG. 1 shows a series of automobiles 10a, 10b and 10c at various locations along a progressive assembly line 12 having an entry point 14 and a number of serially-arranged, spaced-apart, controller-equipped work cells 16 and 18. The vehicles 10 are generically alike but (a) in different stages of assembly and (2) may have different specific content related to model, option level, engine size, etc. Each vehicle 10 has a readable VIN 20, at least one onboard system 22 including electronic data intelligence, and an electronic access port 24 such as a multi-pin connector. In FIG. 1, the assembly line 12 is located in a plant equipped with a "plant network" 26 servicing the entry point 14, the work cells 16, 18, and the "controllers" 28A, 28B in those work cells. The network 26 also serves an input device 30, such as an optical scanner or keyboard, at the entry point and a plurality of physically dispersed "access point" transceivers 32. While only one access point transceiver 32 is shown, it is to be understood that there are many such access point transceivers in a typical automotive assembly plant. For example, in a plant with 50 work cells, there may be 25 or more access point transceivers connected along the network 26 and physically arranged in the plant. Preferably, nearby access point transceivers have overlapping range.

The onboard intelligence systems 22 in the vehicles 10 normally take the form of programmable controllers associated with various accessory and/or system clusters or subgroups within the vehicle. Examples are lighting clusters, engine control systems, door locks, brake systems, navigation systems, active cruise control systems and HVAC systems. All of the onboard controllers are connected together by way of wiring harnesses connected to the port 24, this port typically being located on the vehicles 10a, 10b and 10c under the dashboard.

Each vehicle 10 is marked with a unique and individual product identifier, in this case a vehicle identification number or "VIN" 20, which is readable from the outside of the vehicle 10, typically through the windshield glass in the front left corner. The VIN 20 implies information regarding model, content, accessorization level, and other individual characteristics of the vehicle 10 being assembled. The specification is stored in the network 26 and is available to the work cell controllers 28A and 28B.

At the entry point 14 in the arrangement of FIG. 1 is a queue 34 of mobile transceivers 36 each of which is (1) equipped for wireless data communication with the access point transceivers 32 using, for example, the BLUETOOTH protocol, (2) provided internally and externally with its own unique electronic address, and (3) plug-compatible with the port 24 associated with the intelligence 22 onboard each of the vehicles 10a, 10b and 10c. In a given plant, there are enough mobile transceivers to accommodate every vehicle in the line 12 at any given time and, optionally, enough additional mobile transceivers to allow them to remain in their assigned vehicles for a time after assembly. When installed, the transceivers 36 work with the access point transceivers 32 to provide a data link between each vehicle 10 and the network 26 at all times during the assembly operation.

As shown in FIG. 1, the apparatus of the illustrative embodiment of the invention includes at the entry point 14 an input device 30 such as an optical scanner which is capable of reading both the VIN 20 and the bar codes associated with the transceivers 36. These two quantities of data are input to the network 26 so that they are thereafter correlated in the plant processor (not shown) in such a way that data coming from or going to each mobile transmitter is uniquely directed to an individual vehicle.

It will be understood that the assembly line 12 may be either a constantly moving or intermittently moving type depending on the needs of the particular product being assembled and may have "pull-out" or "push-in" stations where vehicles 10 can be removed from or reintroduced into the line 12 for, as an example, in-process repairs. It will be further understood that the protocol or format of the data transmitted and received by the transceivers 32 and 36 may be in any desirable form. A workable example is the BLUETOOTH protocol which is used for short-range wireless communication throughout the United States and in Canada. The range of the transceivers 32 and 36 using the BLUETOOTH protocol is between 30 and 300 feet. Details of the wireless transceiver 36 are given in FIG. 6.

Along the assembly line 12 from the entry station 14 shown in FIG. 1 is first work cell 16 which is equipped with programmable controller 28A as well as tools such as air wrenches and a supply of components to be installed on the vehicle.

The manner in which data communication is carried out in an illustrative example is explained with reference to FIGS. 2, 3, 4, 5A, 5B, and 5C. As vehicle 10b moves toward and into work cell A, it establishes communication with access point transceiver 32 and, by virtue of this communications link, with the network 26 and all of the data carried by it pertaining to vehicle 10b, its content and build specification, and the assembly functions to be performed at cell 16 using, at least in part, the network-linked controller 28A. This is Step 1. Step 2 in FIG. 5A can be carried out in any of several ways; for example, the input device 30 at the entry point 14 establishes a queue of vehicle identifiers for those vehicles arriving at the cell 16. The cell controller 28A simply receives and maintains a "list" of these identifiers. The next controller 28B does the same and, as long as there are no breaks in the assembly line 12 where vehicles 10 can be removed from or added to the line, no further work is needed to keep track of arriving and departing vehicles at the cells and access points. If there are breaks, then another scanner or other input device such as 30 is provided to identify the vehicles (via the VINs) for the downstream cells.

Figure 2:
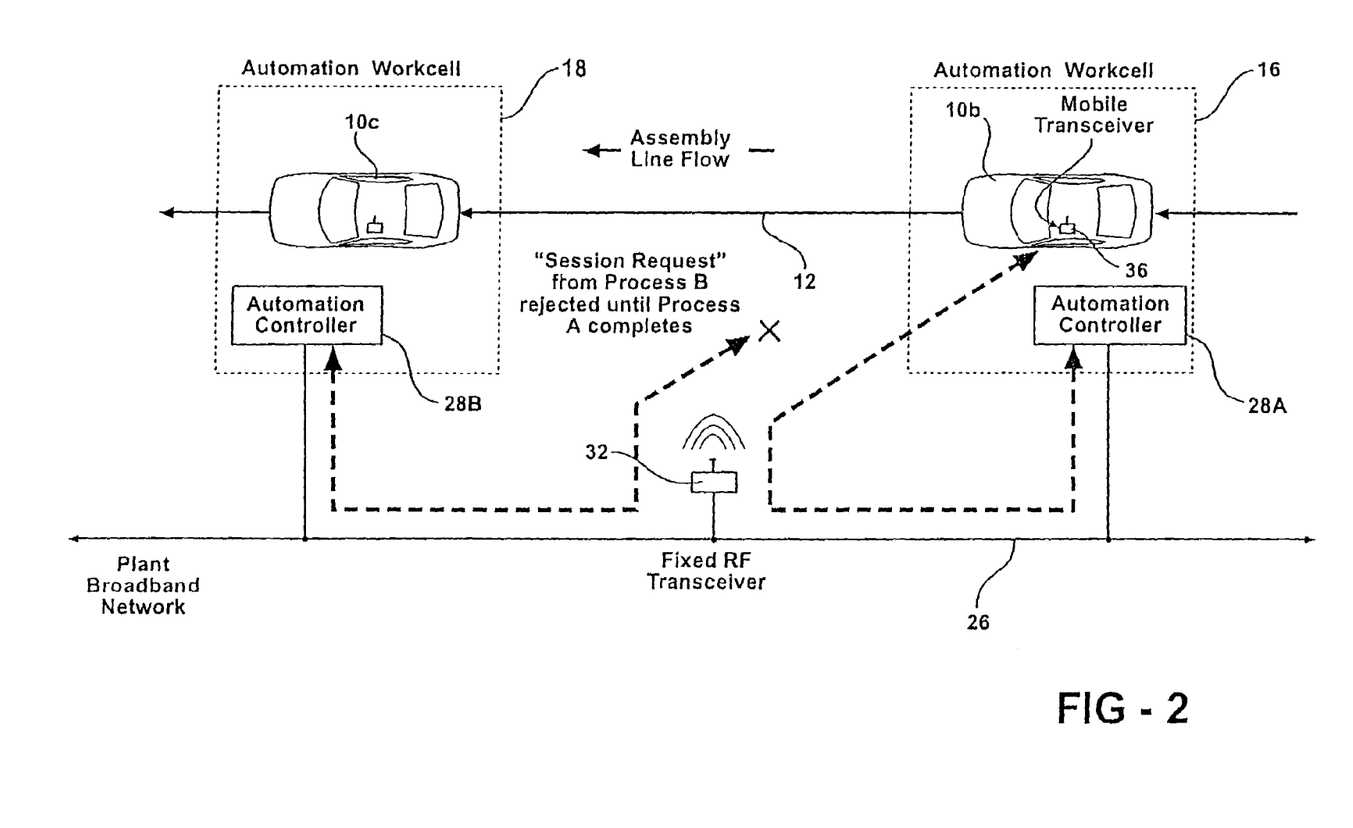
FIG. 2 is a plan view of a representative portion of the assembly line of FIG. 1 in a first stage of communication.
Figure 3:
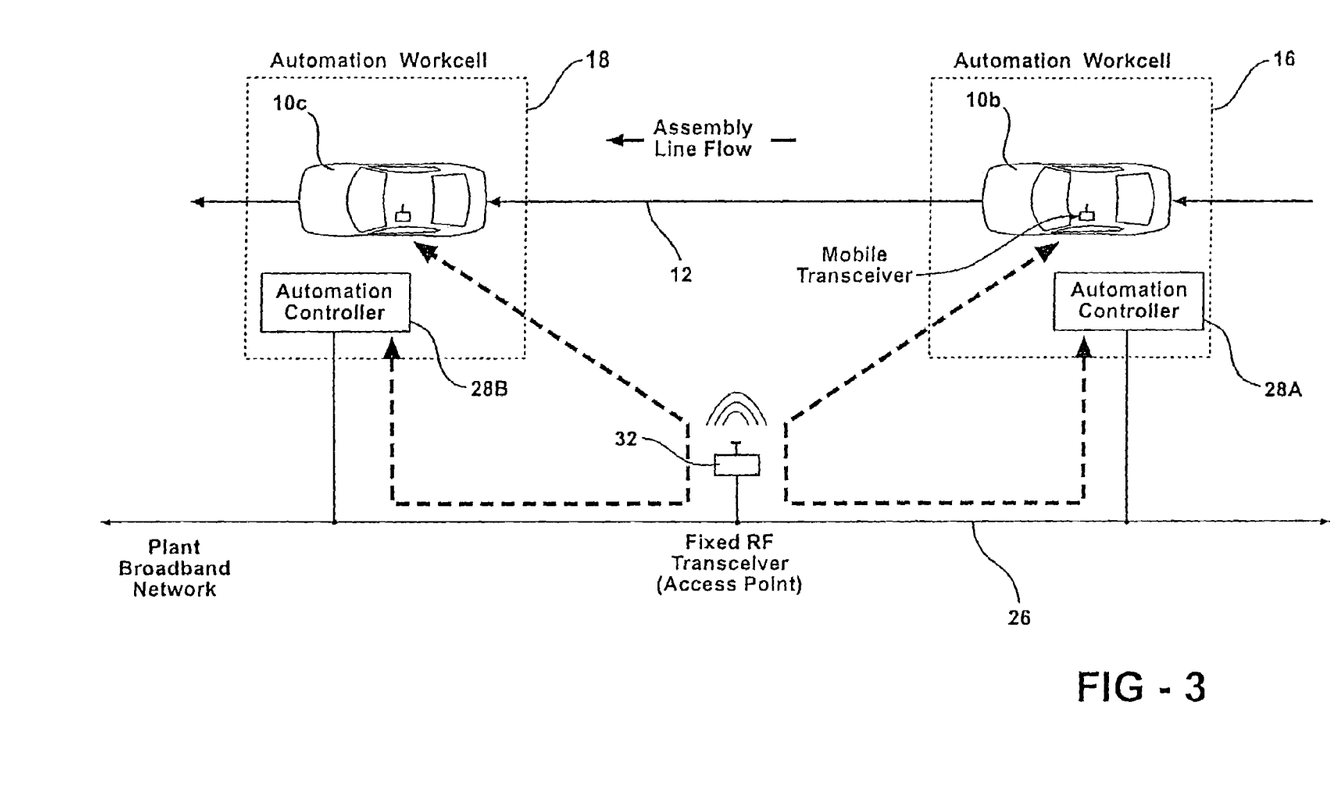
FIG. 3 is a plan view of the representative portion of the assembly line in a second stage of communication.
Figure 4:
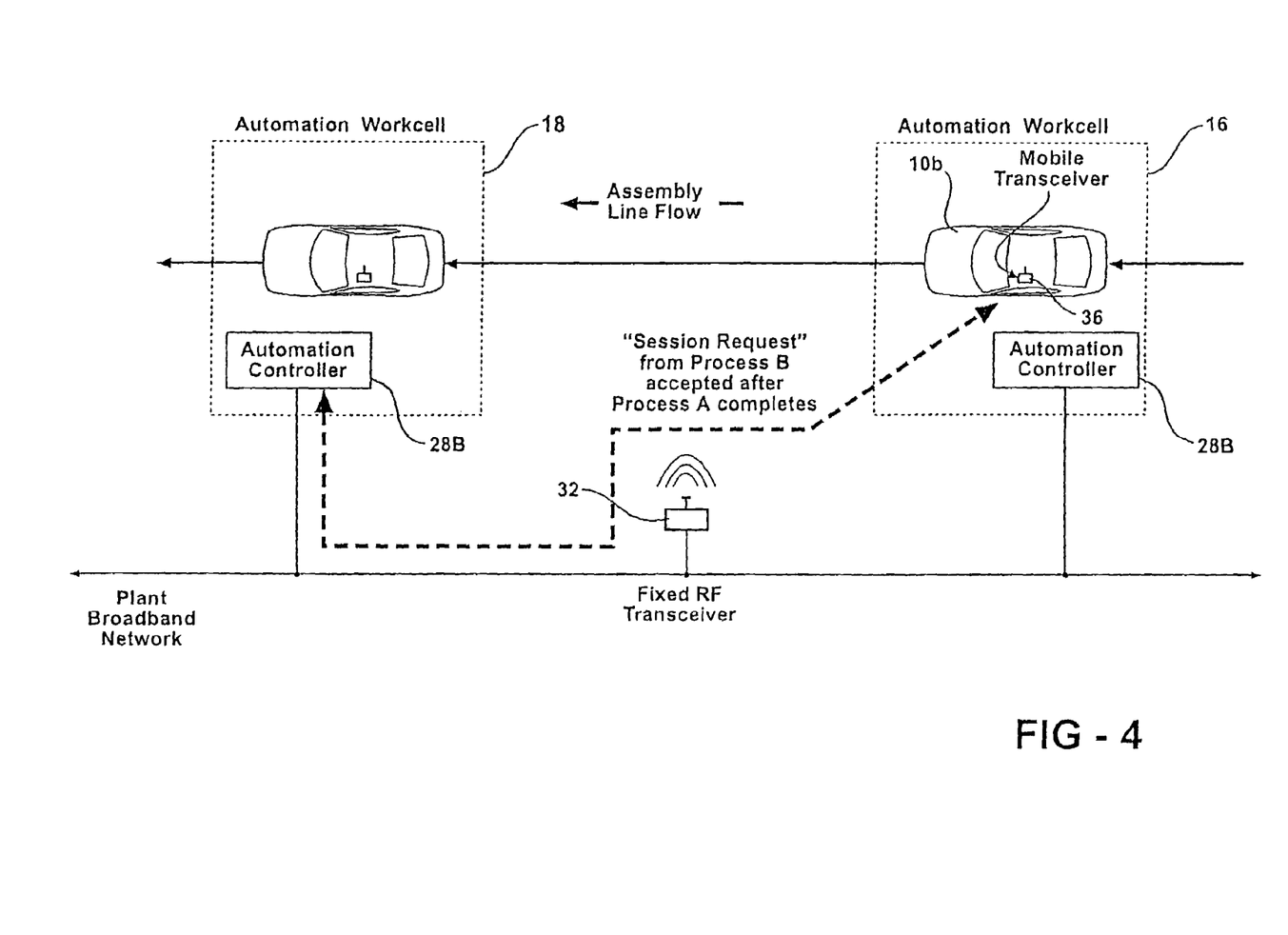
FIG. 4 is a plan view of the representative portion of the assembly line in a third stage of communication.
Figure 5A:
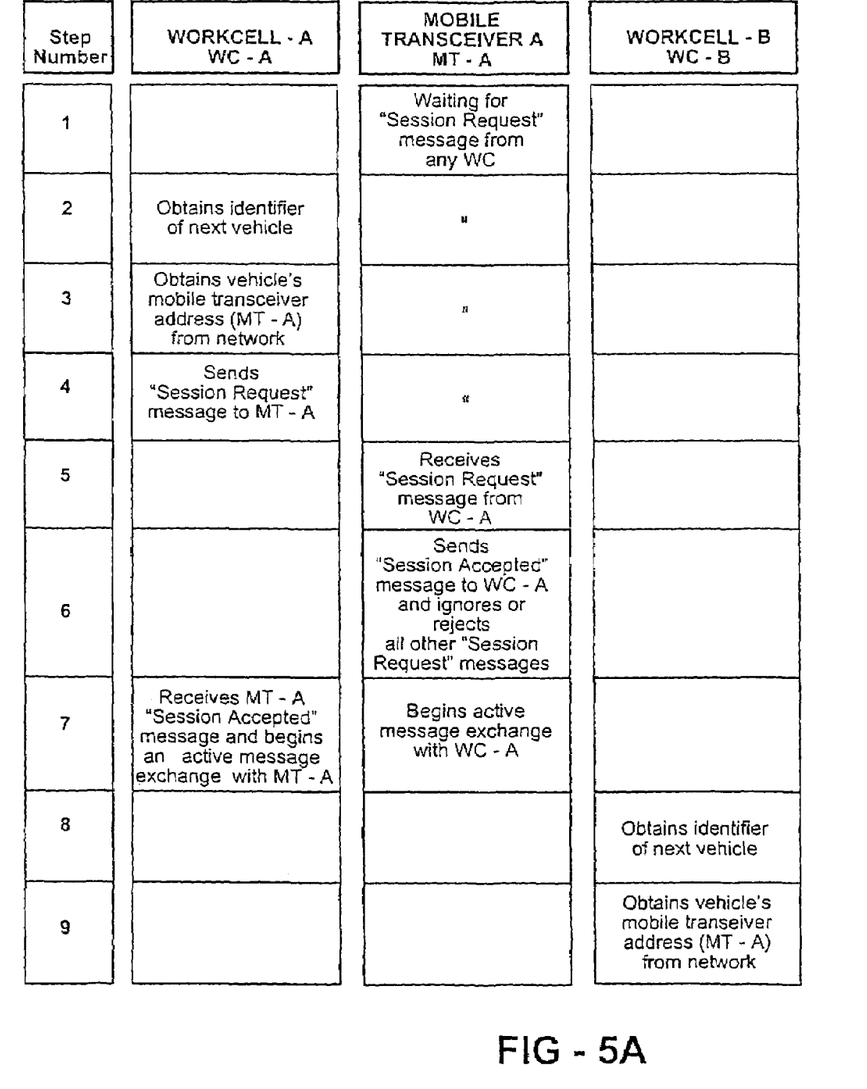
FIGS. 5A–5C are charts describing the sequence of communications in an illustrative example of operation.
Figure 5B:
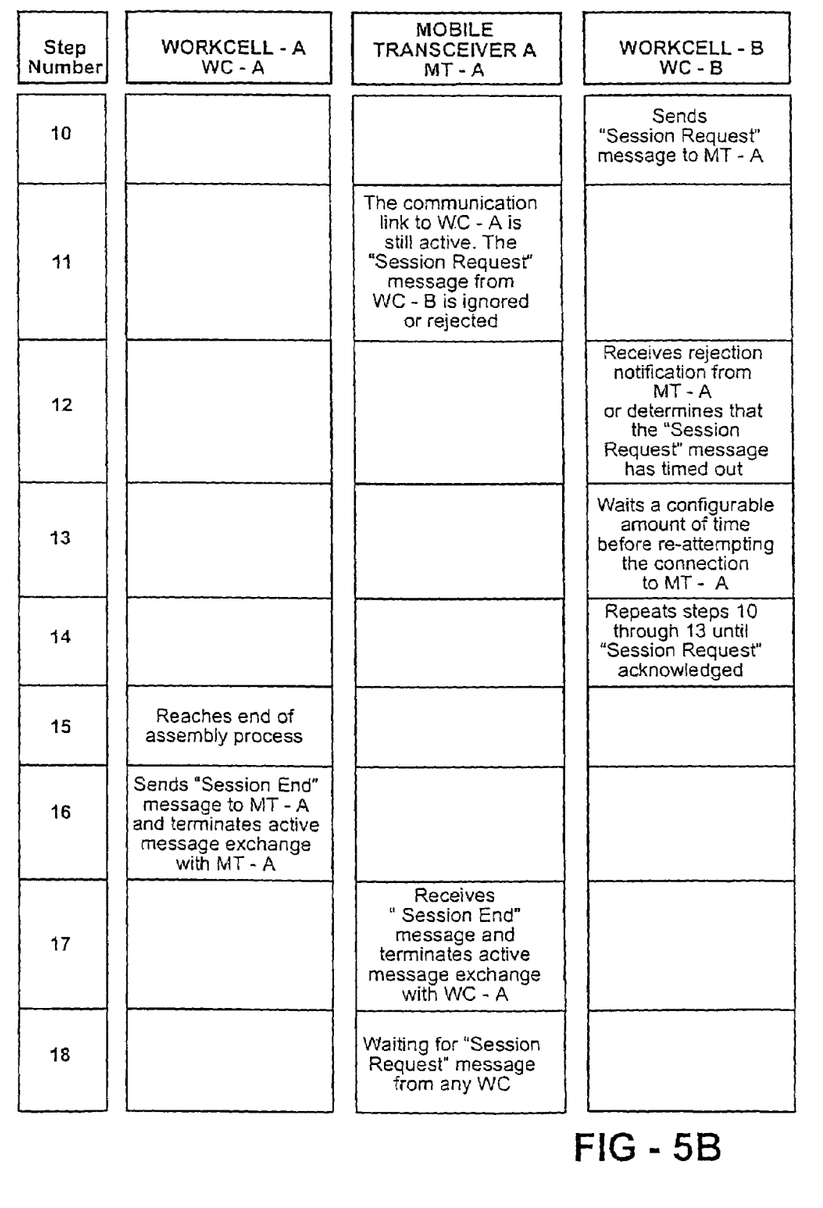
Figure 5C:
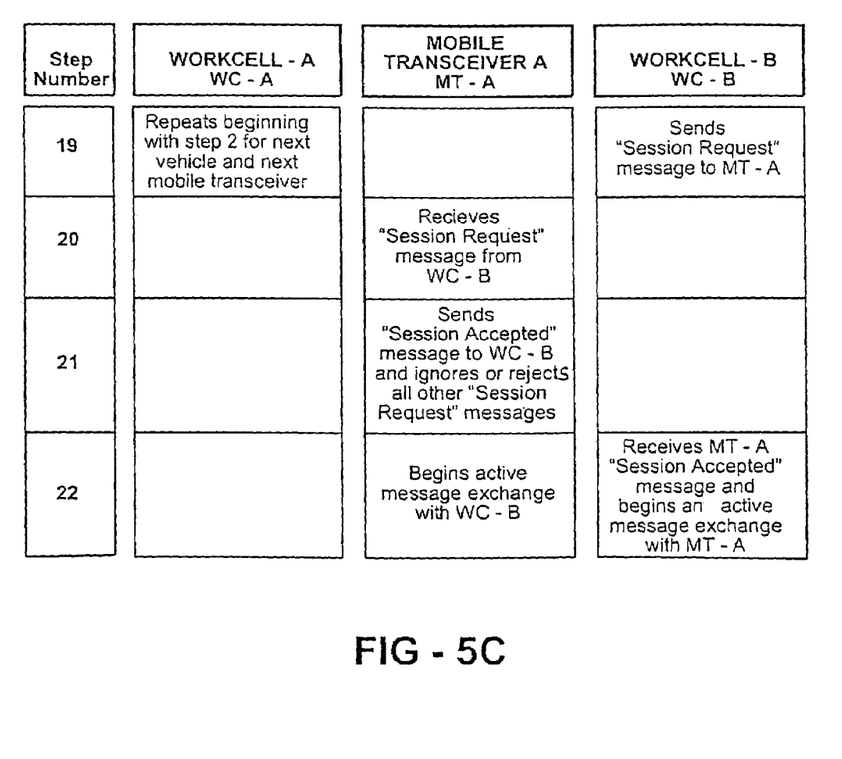

Steps 3–5 in FIG. 5A are self-explanatory. Steps 6–22 are illustrated in FIGS. 2, 3 and 4; i.e., the mobile transceiver 36 in vehicle 10b is in range of access point transceiver 32 and this device serves two cell controllers 28A and 28B. Each cell controller may, at the appropriate time, be sending a "session request" to transceiver 36; i.e., a request using the address of the mobile transceiver 36, but the request from controller 28B will be rejected until the tasks associated with controller 28A are complete.

It is also possible and within the scope of the present invention to require the vehicle assembly network 26 to maintain the product build order for each vehicle on the assembly line 12. Initially, the VIN of the first automobile encountered at a work cell is communicated to the work cell controller 28 either by bar code reader or keypad entry. The entered VIN is thereafter used by the work cell controller to issue a "get specific" request to the vehicle assembly database/network 26 which returns data corresponding to the entered identification. From that point on, the work cell controller may obtain data for successive vehicles by issuing a "get next" query to the network 26 which then automatically advances forward and returns to the next sequential record. This record will, of course, correspond to the next vehicle on the assembly line 12 over a continuous section where neither pulls nor pushes is permitted.

Figure 6:
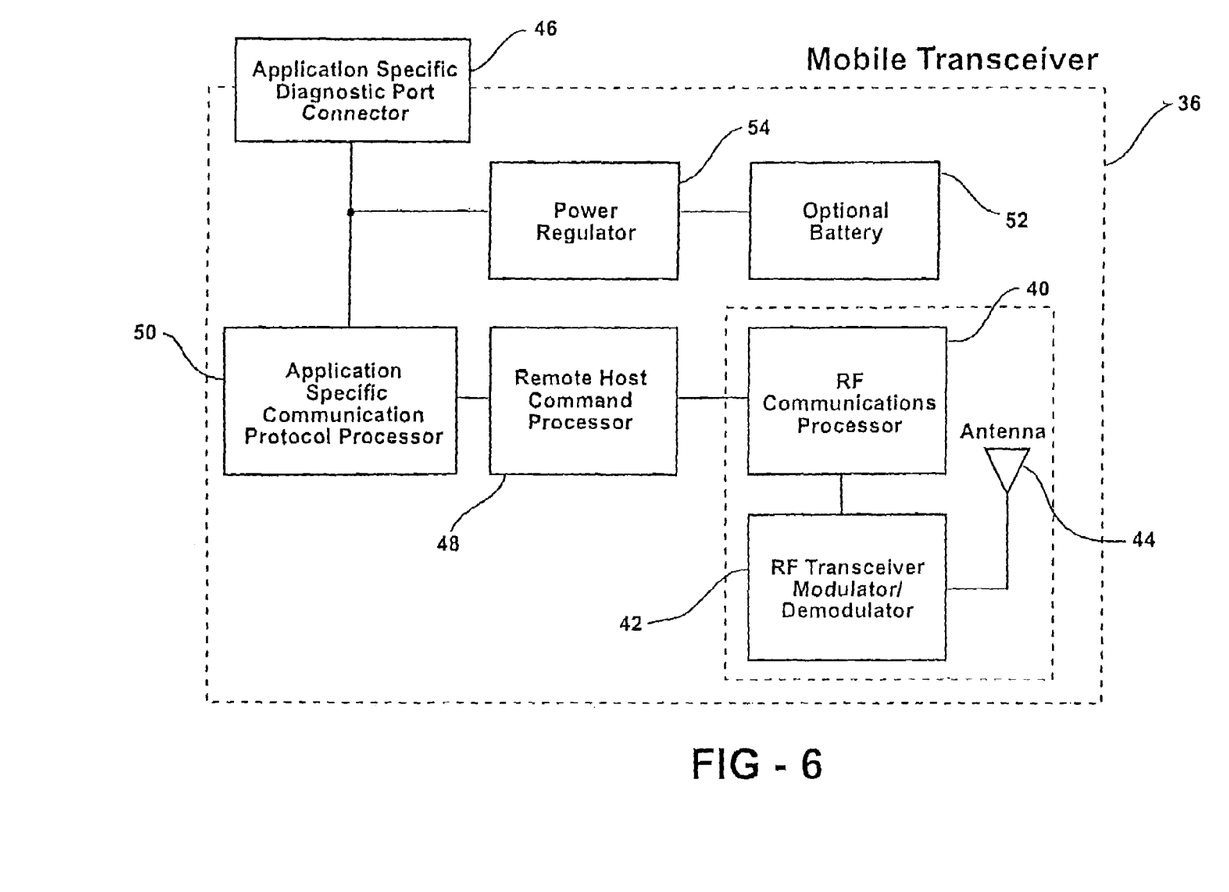
FIG. 6 is a block diagram of a mobile transceiver suitable for use in the embodiment of FIGS. 1–4.

As shown in FIG. 6, the transceiver 36 is provided with an RF communications processor 40, an RF modulator/demodulator 42 and an antenna 44. A connector 46 provides an input/output port for the RF sections 40, 42 via a host command processor 48 and a BLUETOOTH processor 50. The processor 48 has a programmable memory in which the work cell priority ranking is stored. A DC battery 52 provides power for the device through a regulator 54. The connector 46 is, of course, compatible with the port 24 in the automobiles.

As shown in FIG. 1, the vehicle 10 progresses through a number of work cells. After the vehicle 10 goes through the last work cell, the mobile transceiver 36 may be unplugged and removed from the vehicle 10 and taken back to the queue 34 at the entry end of the assembly line 12 or immediately installed in a new vehicle 10. Alternatively, the mobile transceiver may stay with the finished vehicle 10 as it moves to a holding lot so that the particular vehicle can be identified and data associated with it processed during any operation that may be required after assembly. The onboard transceiver 36 may also be used to identify a particular vehicle; for example, a handheld transmitter programmed with the bar code of an individual transceiver 36 may be used to select that transceiver and select a horn honking or headlight flashing function so as to more readily identify a particular vehicle in a large holding lot.

Operation

Referring to the figures, it will be assumed that the products being assembled in the various work cells 16, 18 are automotive vehicles 10 having a variety of complex electronic onboard systems having individual controllers which are interconnected by means of a wiring harness having an access port 24 in the form of a multi-pin connector which is accessible at least during the assembly operation in the interior of the each vehicle. In addition, each vehicle 10 has an optically readable and unique product identifier in the form of a VIN 20. The assembly line 12 comprises a series of sequential work cells 16, 18 and so forth, each of which has some type of automation controller 28 associated with it. The automation controllers 28 are all connected to the in-plant data network 26. In addition, a number of transceivers 32 defining access points to the network 26 are arranged throughout the plant, the distance between the access point transceivers 32 being a function of the RF communication range of the transceivers 32 and each of the mobile transceivers 36 which are placed in a queue 34 so as to be available for temporary installation in the vehicles 10 at the entry point 14 of the assembly line 12.

The first step is to take a mobile transceiver 36 from the queue 34 and install it in the vehicle 10a in the entry point station 14 by connecting the plug connector on the mobile transceiver 36 to the port 24. Integral with this step is the step of scanning both the VIN 20 and the bar code of the installed mobile transceiver 36 using the inputting device 30 so as to inform the network 26 and any controller associated therewith of the identity of the specific vehicle 10a which is at that time located in the entry point station 14; i.e., the specific vehicle 10a which is about to enter the assembly line 12. The network already has the build specification for this vehicle in storage.

In this example, it is assumed that there is only one assembly line entry point and that the vehicles to be assembled at the various cell locations along the line are entered seriatim. The invention, however, embraces multiple product entry points including both parallel entry arrangements at the beginning of the assembly line and breaks or opening in the assembly line where vehicles can be permanently or temporarily withdrawn and other vehicles added. This is essentially a matter of providing the appropriate devices for identifying all vehicles to be added to or taken from the assembly line series so that the network processor knows at any given point on the assembly line what the order of appearance of the vehicles (or other products) will be.

Assuming the vehicle 10a begins to move along the assembly line 12 from the entry point 14 toward the first work cell 16 and that the mobile transceiver 36 installed in the vehicle 10a is turned on and is ready for wireless communication with any and/or all of the access point transceivers 32 which are located along the network 26, the objective is to create two-way wireless data communication between the onboard mobile transceiver 36 and the automation controller 28A of the first work cell 16 to the temporary exclusion of effective communication with any of the other automation controllers in the system. Of course, the mobile transceiver 36 on any given vehicle may be out of range of most of the access point transceivers 32 in a large plant at any given time. However, an objective of the present system is to arrange the spacing and locations of the dispersed access point transceivers 32 such that every onboard mobile transceiver 36 can always reach at least one access point transceiver. It should be remembered, however, that the work cell controllers determine the order in which session requests are sent and this, in turn, determines which mobile transceivers on the line are addressed by the content of the data being broadcast by any given access point transceiver.

As shown in FIG. 2, the onboard mobile transceiver 36 accesses the network 26 by way of the access point transceiver 32 which is located essentially between the work cells 16 and 18. The automation controller 28A associated with work cell 16 is constantly sending a session request using the address of the approaching mobile transceiver in vehicle 10a as it approaches the work cell 16, this signal or session request being broadcast through the nearby access point transceiver 32. Automation controller 28B is also broadcasting a session request through the access point transceiver 32. The mobile transceiver 36 on the approaching vehicle is programmed to accept only the session requests using its address and then only in an order determined by a table which is carried in each mobile transceiver. As indicated in FIG. 2, transceiver 36 accepts only the session A request until such time as all components of the assembly process defined in session A have been completed; i.e., the session request from the automation controller 28B are rejected during this time. There may be many such session requests on the network 26 at this time and they, too, are broadcast to the mobile transceiver 36 by way of the access point transceiver 32. But only one or two will include the address of the transceiver 36. Moreover, only the highest ranking session request reaches the vehicle during the assembly operation. This is essentially shown in FIG. 3 of the drawings where the access point transceiver 32 is simultaneously serving both vehicles 10b and 10c in the work cells 16 and 18, respectively.

As shown in FIG. 4, there will come a time when all of the components of the session A assembly subprocess are completed. At this time, the program software is such as to hand the vehicle 10b off to the automation controller 28B in work cell 18 even though the vehicle 10b is still, at this time, essentially or entirely within the physical confines of the work cell 16. In other words, the session B request is accepted. In this fashion, preparation steps necessary to or integral with the subassembly operation unique to automation controller 28B in work cell 18 can be accomplished well in advance of the arrival of the vehicle 10b in the work cell 18. The vehicle 10b progresses to the position shown for vehicle 10c in FIG. 1; i.e., it enters the work cell 18 and the balance of the assembly subprogram unique to work cell 18 is completed.

It can be seen from the foregoing that the vehicles on the assembly line are in constant contact with the network 26 by way of the dispersed access point transceivers 32 and the radio contact which is maintained between the network and the onboard intelligence of the vehicle 10 by way of the wireless radio link. Remote host command processor 48 is programmed to establish a hierarchy or listing of work cell subassembly programs and control the order in which those programs are addressed and carried out.

Figure 7:
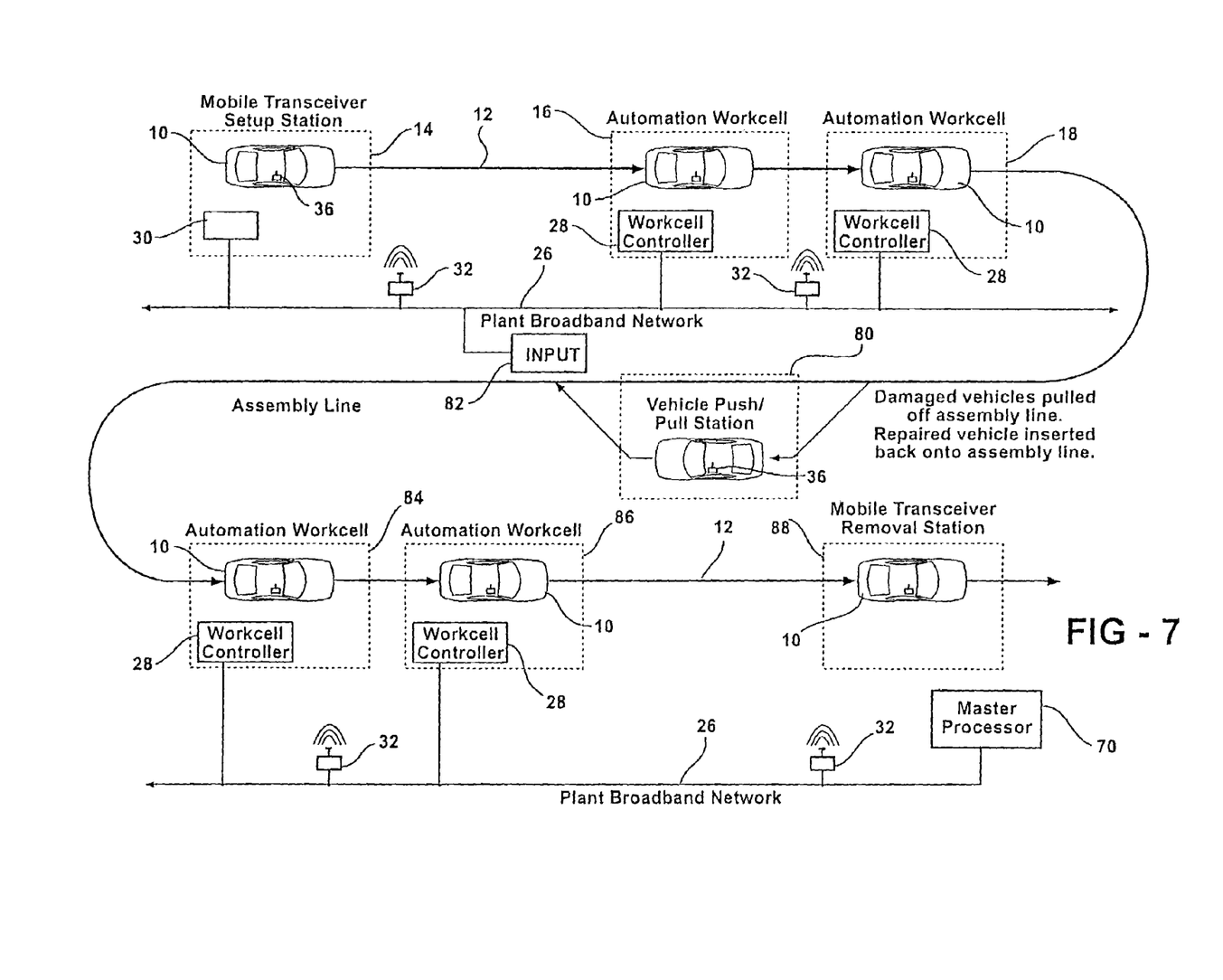
FIG. 7 is a layout of a representative assembly plant equipped in accordance with the present invention.

Referring now to FIG. 7, a typical, if simplified, plant layout is shown. This layout defines an assembly line 12 and a data network 26 with dispersed access point transceivers 32 in communication with work cell controllers 28 and a master processor 70. An entry station 14 is equipped as described above. After serial work cells 16 and 18, there is a station 80 where vehicles 10 can exit the line or be added to the line to accommodate the need for repair work. A device 82 is provided at station 80 to re-identify vehicles 10 added to the line; note that these vehicles are already equipped with mobile transceivers 36 which have been logically correlated with the VINs of their associated vehicles. After station 80, vehicles 10 progress through work cells 84 and 86 until they finally reach the terminus 88 where the mobile transceivers 36 are removed.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for establishing and maintaining data communication between a product and an assembly plant network serving controllers in multiple work cells through which the product is caused to pass in sequence during an assembly procedure, wherein the product has an onboard intelligent controller, a wiring system with a plug connector for access to the onboard controller, and an individual identifier code, wherein the method comprises the steps of:

connecting to the controller plug connector a mobile wireless transceiver having a data communication capability, an address and a connector compatible with the controller connector;

initially correlating the address of the mobile wireless transceiver with the individual identifier code of the product in the plant network thereby to identify the product as it moves into and between work cells;

attaching the mobile wireless transceiver to the product by way of the connectors associated with the transceiver and controller, respectively;

providing a plurality of spatially distributed access point transceivers connected to the assembly plant network;

progressively advancing the product between the work cells while maintaining interrupted communication between the mobile transceiver and the network via the access point transceivers; and performing pre-assigned assembly operations on the product in the work cells using data which is communicated between the mobile wireless transceivers and the assembly plant network by way of the access point transceivers during the assembly procedure.

2. The method of claim 1 including the further step of receiving signals from two adjacent access point transceivers and using data for assembly operations only from one transceiver.

3. The method of claim 1 wherein the product is a vehicle.

4. The method of claim 1 wherein the individual identifier code is a VIN.

5. The process of claim 1 wherein the unique address is implemented on the outside surface of the mobile wireless transceiver as a bar code.

6. The process of claim 5 including the step of reading the bar code by an optical scanner.

* * * * *